United States Patent [19]

Lygum

[11] Patent Number: 5,643,075
[45] Date of Patent: Jul. 1, 1997

[54] SHAPING MACHINE

[75] Inventor: Poul Lygum, Bakel, Netherlands

[73] Assignee: Tetra Laval Food Koppens B.V., Bakel, Netherlands

[21] Appl. No.: 545,803

[22] PCT Filed: Jul. 13, 1994

[86] PCT No.: PCT/NL94/00165

§ 371 Date: Nov. 8, 1995

§ 102(e) Date: Nov. 8, 1995

[87] PCT Pub. No.: WO95/02337

PCT Pub. Date: Jan. 26, 1995

[30] Foreign Application Priority Data

Jul. 15, 1993 [NL] Netherlands ............... 9301248

[51] Int. Cl.⁶ .................................................. A22C 7/00
[52] U.S. Cl. ...................................................... 452/174
[58] Field of Search ................... 452/174, 42; 425/236, 425/147, 240, 241; 426/513

[56] References Cited

U.S. PATENT DOCUMENTS

| | | |
|---|---|---|
| 3,121,449 | 2/1964 | Marchadour . |
| 3,964,127 | 6/1976 | Holly . |
| 4,356,595 | 11/1982 | Sandberg et al. ............ 452/174 |
| 4,597,135 | 7/1986 | Holly et al. ................. 426/513 |
| 4,801,097 | 1/1989 | Fitch . |
| 5,021,025 | 6/1991 | Wagner ....................... 452/174 |
| 5,022,888 | 6/1991 | Lindee ........................ 452/174 |
| 5,149,293 | 9/1992 | Lindee . |

FOREIGN PATENT DOCUMENTS

| | | |
|---|---|---|
| 0218790 | 4/1987 | European Pat. Off. . |
| 0447003 | 9/1991 | European Pat. Off. . |
| 2156248 | 5/1973 | France . |
| 7300937 | 7/1973 | Netherlands . |
| 1502026 | 2/1978 | United Kingdom . |

*Primary Examiner*—Willis Little
*Attorney, Agent, or Firm*—Young & Thompson

[57] ABSTRACT

A shaping machine for dividing a deformable mass, such as a meat product, into separately shaped portions comprises a stock container, at least two piston-cylinder units for alternately feeding in the mass from the stock container to a shaping plate provided with shaped recesses, and also means for removing the shaped portions from the shaping plate. Valve means for connecting the cylinder alternately to the stock container are also provided. The cylinders are accommodated next to each other in a housing which has a chamber connecting at one side to the shaping plate and at the other side to the cylinders, while the valve means also operate the connection between chamber and cylinders.

12 Claims, 6 Drawing Sheets

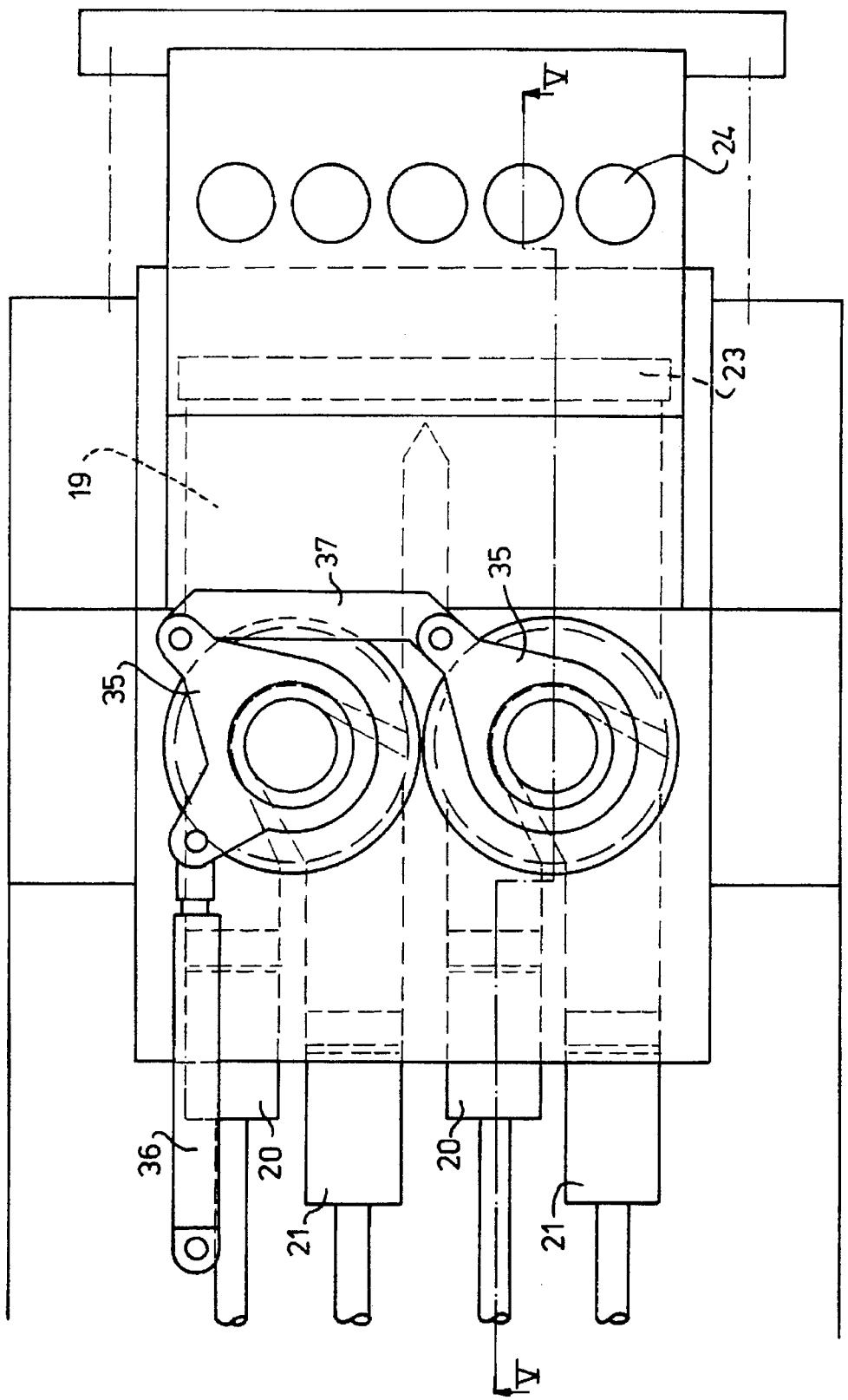

SHAPING MACHINE

The invention relates to a shaping machine for dividing a deformable mass, such as a meat product, into separately shaped portions, comprising a stock container, at least two piston-cylinder units for alternately feeding in the mass from the stock container to a shaping plate provided with shaped recesses, end also means for removing the shaped portions from the shaping plate.

Such a shaping machine is known from U.S. Pat. No. 4372008. In this case a meat mass is kept ready in a container, end is conveyed in the direction of a number of vertically disposed screw conveyors by means of a conveyor belt on the bottom of the container. These screw conveyors force the meat mass downwards to the entrance to the cylinders. Finally, the meat mass is pushed up into the cylinders by appropriate pistons end extruded in a shaping plate.

In order to ensure that the meat product ultimately obtained has an acceptable texture, it is desirable to handle the meat mass carefully. Too rough handling leads to too great disintegration, which adversely affects the quality of the end product. In this respect the known shaping machine is not very satisfactory, owing to the conveyance movement produced by conveyor belt end conveyor screws. The meat mass is often compressed too much in the vicinity of the conveyor screws, while parts of said mass also carry out a circular movement.

The object of the invention is therefore to provide a shaping machine of the above-described type which does not have these disadvantages. This is achieved through valve means being provided for connecting the cylinders alternately to the stock container. The meat mass can be fed into the appropriate cylinder by way of the valve means, which ensures a more uniform treatment. The result of this is that the texture of the meat mass remains better preserved. The two cylinders are filled alternately, end they also convey the meat mass alternately to the shaping plate. Despite the intervals in the feed per cylinder, a sufficiently constant feed for the entire shaping machine can still be obtained in this way.

The cylinders are accommodated next to each other in a housing which has a chamber which connects to the shaping plate at one side end to the cylinders at the other side, while the valve means also operate the connection between chambers and cylinders. The valve means fulfil a dual function, namely connecting the cylinders alternately to the stock container or to the shaping plate. For this purpose, the valve means can be moved between two positions, in each of which the connection between one of the cylinders and the chamber is shut off and the connection between that cylinder and the stock container is opened each time.

According to a preferred embodiment, a swivellable valve element is provided in the chamber, which valve element has a passage whose one end is permanently connected to the stock container by way of an opening in the top wall of the chamber, and whose other end in both positions of the valve element is connected to the appropriate cylinder in each case. The passage provides a good uniform guidance of the meat mass to the appropriate cylinder.

The chamber can be designed with a rectangular cross-section, in that case the valve element having a bottom and top base plate with circular periphery which interacts in a sealing manner with the bottom chamber wall. The valve element also has a top base plate with circular periphery which interacts in a sealing manner with the top chamber wall.

In order to improve the sealing action of the valve element, each base plate is accommodated in a correspondingly shaped recess in the appropriate wall of the chamber.

The swivellable valve element can be designed in various ways. According to a preferred possibility, provision is made for a channel which is bent through 90° and one end of which is concentric in relation to each base plate, while the other end can be connected to one of the cylinders in each case.

A special embodiment can have two pairs of piston-cylinder units and also a valve means belonging to each pair.

Moreover, each pair of piston-cylinder units can interact with its own essentially conical stock container, which stock containers intersect each other in a common vertical plane, thus forming a common recess in their facing wall parts.

The invention will be explained in greater detail below with reference to the examples of embodiments shown in the figures.

FIG. 6 shows a section along IV—IV.

Figure 1:
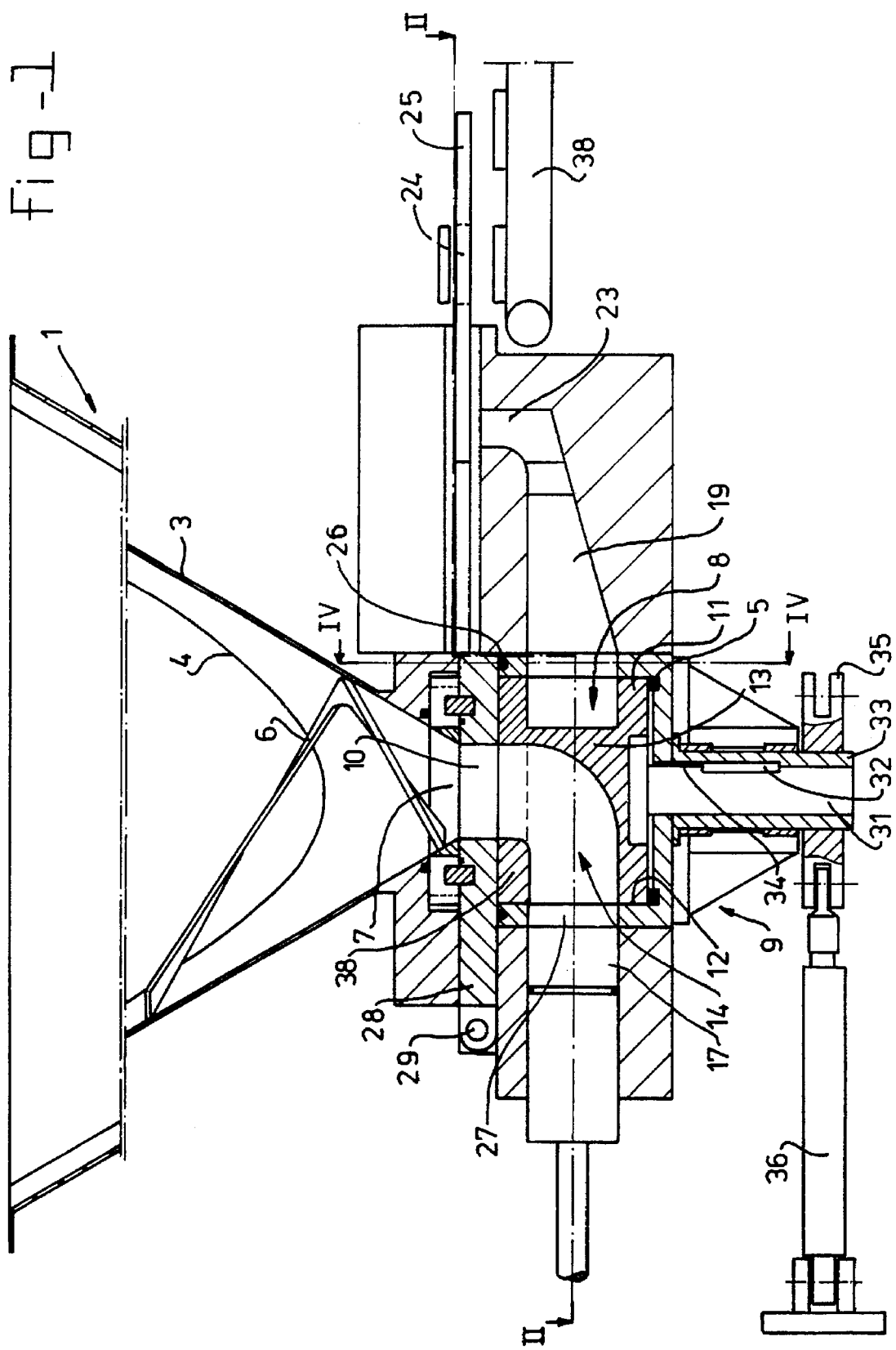
FIG. 1 shows a side view, partially in section, along I—I in FIG. 2, of a first embodiment of the shaping machine.

The shaping machine shown in FIGS. 1-4 has a stock container 1, consisting of two partially conical containers 2, 3 which adjoin each other with their common intersecting line 4. A screw element 6 is disposed in each container 2, 3. The rotary movement of these screw elements 6 is synchronized in such a way that they can move freely past each other in the region where the containers 2, 3 intersect each other.

At their bottom side, both containers have a hole 7, to which the meat mass placed in the containers is forced in a uniform manner by the screw elements 6.

Figure 4:
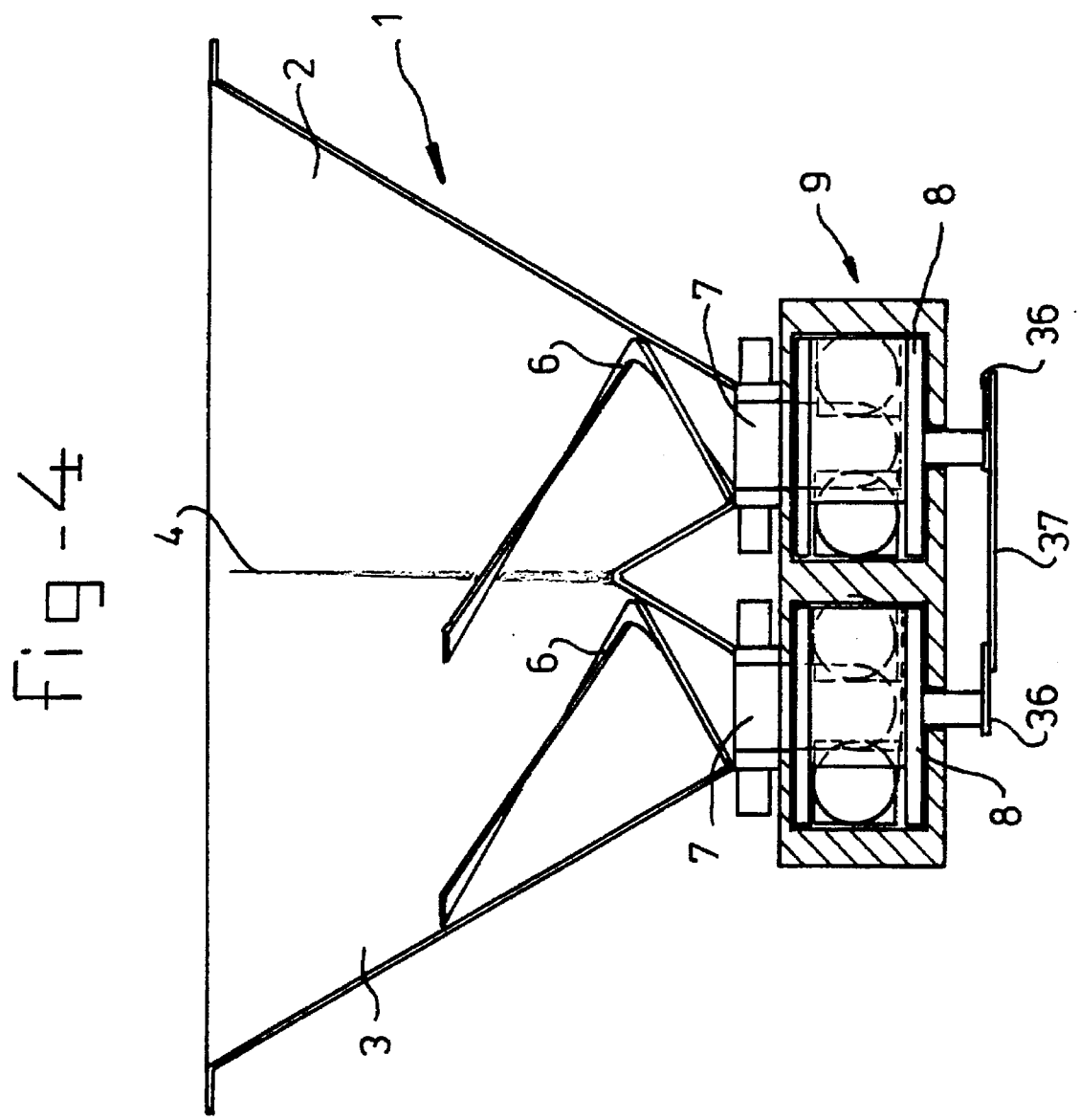
FIG. 4 shows an end view.

The containers 2, 3 connect with their holes 7 to respective valve elements 8, which are situated in housing 9. Said housing has a rectangular cross-section, as can be seen in FIG. 4. The valve elements are accessible by way of holes 10, corresponding to the holes 7, in the top of plate 28.

Each valve element 8 has a circular bottom base plate 11 and top base plate 38. These plates 11, 38 are accommodated in correspondingly shaped recesses in bottom wall and top wall respectively of housing 27, and are sealed with sealing rings 5. The channel 14 extends between said plates 11, 38. Said channel 14 has a top end which opens out concentrically relative to the top base plate 38 and hole 7 of the appropriate container. The passage channel also has a part bent through 90°. This bent part can connect to one of the cylinders 17, 18.

Figure 2:
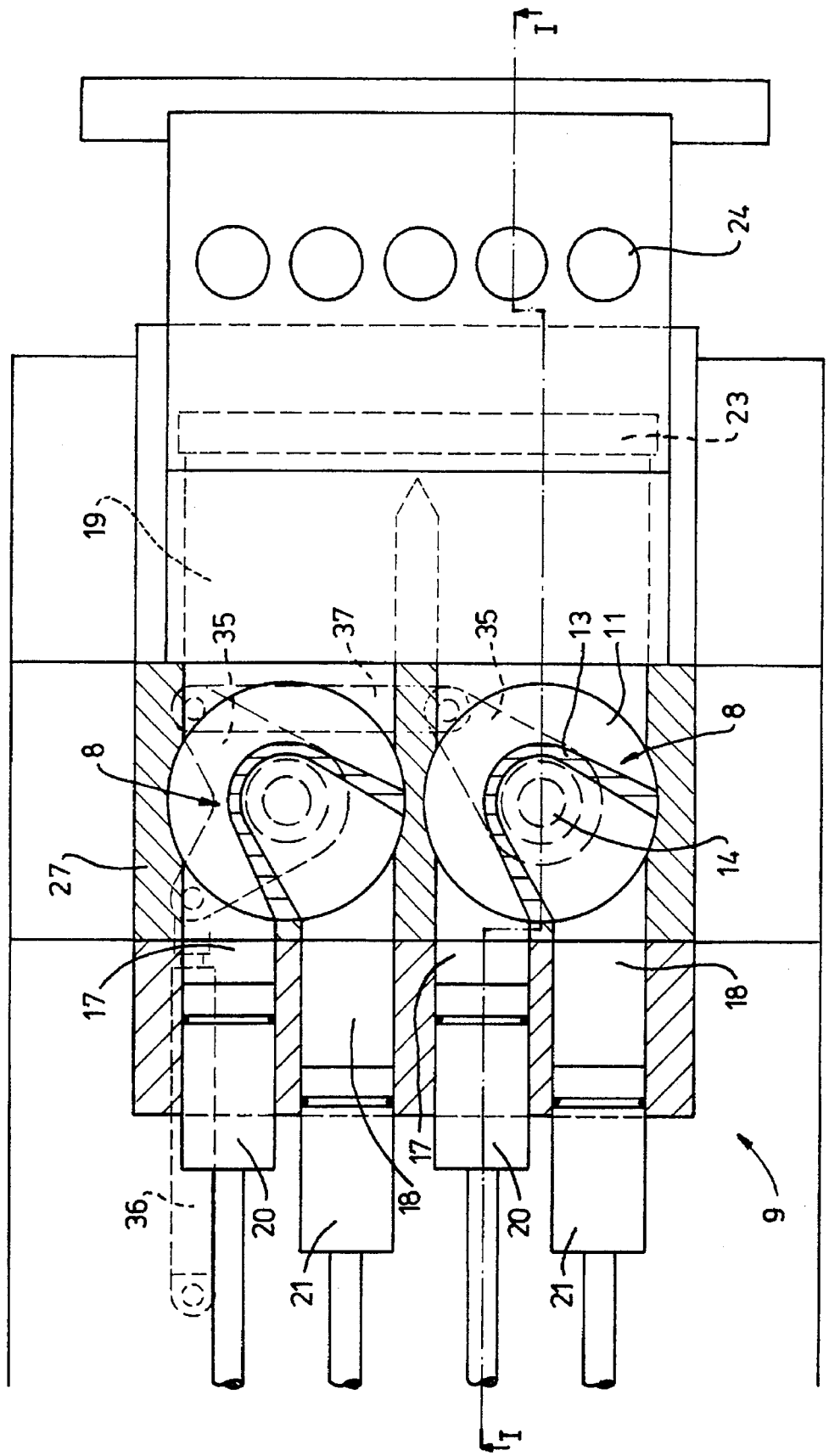
FIG. 2 shows a section along II—II of the shaping machine shown in FIG. 1.
Figure 3:
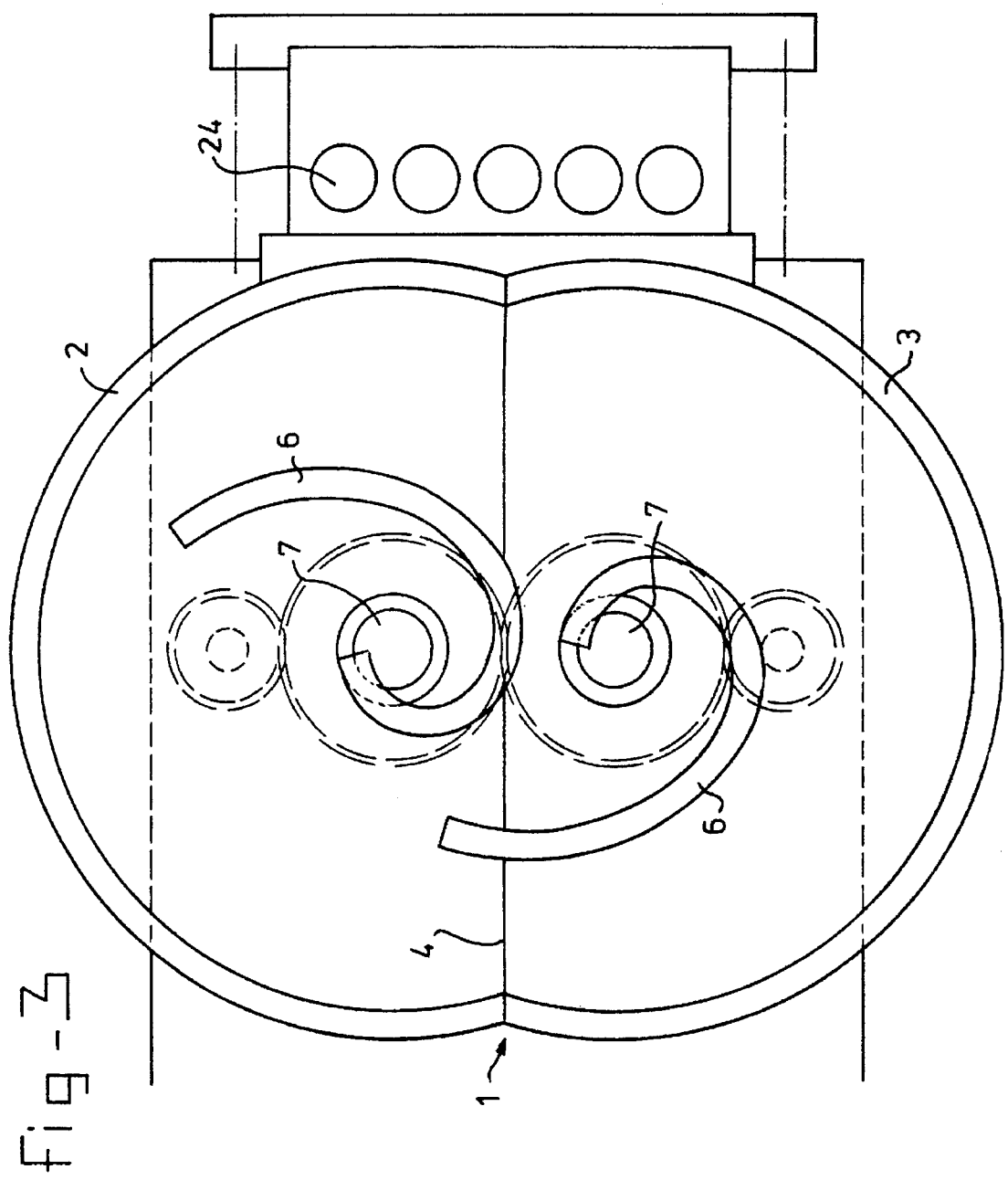
FIG. 3 shows a top view of FIG. 1.

As can be seen in FIG. 2, each valve element 8 is accommodated in the housing 9 in each case between two cylinders 17, 18, on the one hand, and chamber 19, on the other hand. In the position shown, each valve element 8 shuts off cylinder 18 relative to chamber 19 and allows cylinder 17 free access to said chamber 19.

At the same time, in the position shown, passage channel 14 forms a connection between container 2, 3 and cylinder 18, while the connection between container 2, 3 and cylinder 17 is broken.

As already mentioned, pistons 20, 21 are provided in the cylinders 17, 18 respectively. These pistons can each be driven by their own drive. In the position shown, cylinders 17 are at the beginning of their suction stroke, and cylinders 18 are at the beginning of their compression stroke. During the suction stroke the cylinders 18 fill up, while the pistons 20 empty the cylinders 17, and their meat mass goes into the chamber 19. The meat mass is then forced from the bottom through the outlet 23 into the recesses 24 in shaping plate 25. Said shaping plate is moved to and fro in a cycle, by means which are not shown, between the filling position, in which the recesses lie opposite outlet 23, and the ejection position, in which the recesses lie above the conveyor belt 38. The shaped portions are removed from the recesses 24 by means of an ejection device (not shown) and discharged on conveyor belt 38.

In order to prevent air from being sucked in during the piston stroke, sealing rings 26 are fitted, in addition to sealing rings 5. These sealing rings 26 are accommodated in a housing which is indicated in its entirety by 27, and which fits in a sealing manner into the chamber. Resting on the top of each housing is a plate 28, on which a container 2, 3 is disposed in each case. These plates 28 can be swung up about hinge 29, for the purpose of cleaning the shaping machine.

Moreover, when plate 28 is folded up the entire valve means 8 can be removed. For this purpose, the valve means is slidable, with drive shaft 31 on which key 32 is disposed, in sleeve 33 with keyway 34.

Lever 35 is fixed to sleeve 33, which lever can in turn be operated by the hydraulic piston-cylinder unit 36. The levers 35 of the two valve means are connected by way of coupling rod 37, in such a way that they are always in the same position.

Figure 5:
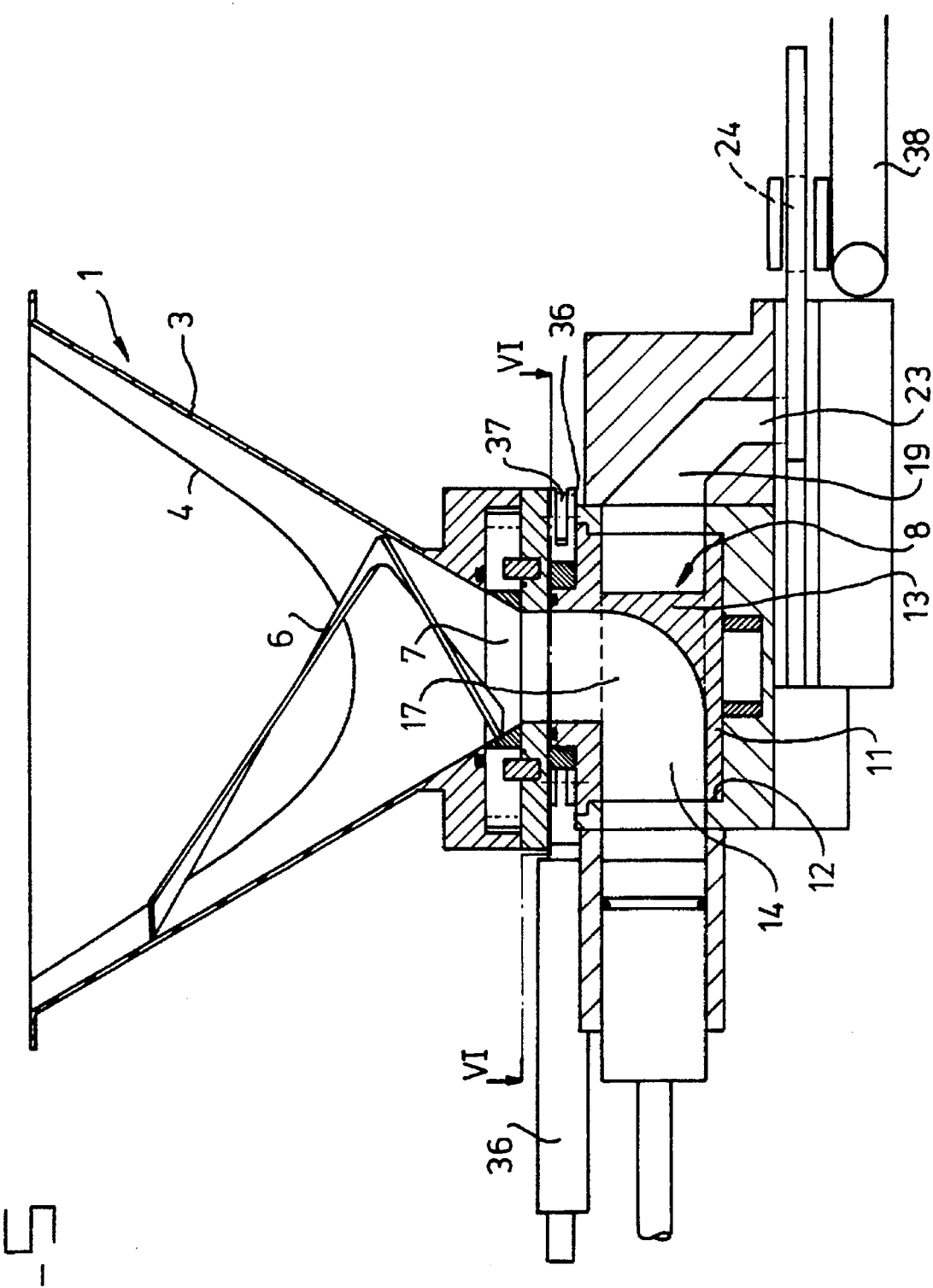
FIG. 5 shows a side view corresponding to FIG. 1 of a second embodiment of the shaping machine.

In the variant shown in FIGS. 5 and 6 the meat mass is forced from the top into the recesses 24 in the shaping plate. This means that the channel 23 can be short, which has a beneficial effect on the quality of the shaped mass. The levers 35 are now fitted on the top side of each valve means 8.

I claim:

1. Shaping machine for dividing a deformable mass, such as a meat product, into separately shaped portions, comprising a stock container, a shaping plate provided with shaped recesses, at least two piston-cylinder units for alternately feeding in the mass from the stock container to said shaping plate and also means for removing the shaped portions from the shaping plate, characterized in that valve means are provided for connecting the cylinders alternately to the stock container.

2. Shaping machine according to claim 1, in which the cylinders are accommodated next to each other in a housing which has a chamber connecting at one side to the shaping plate and at the other side to the cylinders, while the valve means also operate the connection between chamber and cylinders.

3. Shaping machine according to claim 2, in which the valve means can be moved between two positions, in each of which the connection between one of the cylinders and the chamber is shut off and the connection between that cylinder and the stock container is opened each time.

4. Shaping machine according to claim 3, in which a swivellable valve element is provided in the chamber, which valve element has a passage whose one end is permanently connected to the stock container by way of an opening in the top wall of the chamber, and whose other end in both positions of the valve element is connected to the appropriate cylinder in each case.

5. Shaping machine according to claim 4, in which the chamber has a rectangular cross-section, and the valve element has a bottom base plate with circular periphery which interacts in a sealing manner with the bottom chamber wall.

6. Shaping machine according to claim 5, in which the valve element has a top base plate with circular periphery which interacts in a sealing manner with the top chamber wall.

7. Shaping machine according to claim 5, in which each base plate is accommodated in a correspondingly shaped recess in the appropriate wall of the chamber.

8. Shaping machine according to claim 5, in which provision is made for a channel which is bent through 90° and one end of which is concentric in relation to each base plate, while the other end can also be connected to one of the cylinders.

9. Shaping machine according to claim 1, in which the chamber connects to the bottom side of the shaping plate.

10. Shaping machine according to claim 1, in which the chamber connects to the top side of the shaping plate.

11. Shaping machine according to claim 1, in which two pairs of piston-cylinder units and a valve means belonging to each pair are provided.

12. Shaping machine according to claim 11, in which each pair of piston-cylinder units interacts with its own essentially conical stock container, which stock containers intersect each other in a common vertical plane, thus forming a common recess in their facing wall parts.

* * * * *